United States Patent

[11] 3,633,219

| [72] | Inventor | Paul W. Byrd<br>12262 Harbor Blvd., Garden Grove, Calif. 92640 |
|---|---|---|
| [21] | Appl. No. | 65,596 |
| [22] | Filed | Aug. 20, 1970 |
| [45] | Patented | Jan. 11, 1972 |

[54] PREFABRICATED WASTE-RECEIVING UNIT
10 Claims, 5 Drawing Figs.

[52] U.S. Cl. ........................................................ 4/10, 4/8, 4/114
[51] Int. Cl. ............................................... E03d 1/00, E03d 3/00, E03d 5/00
[50] Field of Search ........................................... 4/10, 8, 114, 132; 137/236, 247.27

[56] References Cited
UNITED STATES PATENTS

| 2,398,828 | 4/1946 | Gray | 137/236 X |
| 2,514,230 | 7/1950 | Feavel | 4/114 |
| 2,772,420 | 12/1956 | Carter | 4/114 X |
| 2,915,081 | 12/1959 | Warren | 4/114 X |
| 3,040,333 | 6/1962 | Merrill | 4/8 |
| 3,196,894 | 7/1965 | Bodi | 137/236 X |
| 3,528,462 | 9/1970 | Quase | 4/10 X |

*Primary Examiner*—Herbert F. Ross
*Assistant Examiner*—Henry K. Artis
*Attorney*—William C. Babcock

ABSTRACT: A prefabricated waste-receiving unit that is particularly adapted for installation in travel trailer and recreation parks and other areas in which vehicles containing living quarters are situated, and the unit capable of being connected to existing sewer facilities. The units are longitudinally aligned and spaced, with each unit serving a particular area in which a camper, trailer or the like may be temporarily parked.

PATENTED JAN 11 1972

3,633,219

INVENTOR.
PAUL W. BYRD
BY
William G. Babcock
ATTORNEY

PREFABRICATED WASTE-RECEIVING UNIT

Campers, trailers and like vehicles are provided with waste-receiving tanks that are utilized during the time the vehicle is on the road, and these tanks having valves associated therewith that permit waste material to be discharged by flexible conduits to sewer facilities when the vehicles are parked. During the time a trailer or camper is parked, the valve remains open and the flexible conduit is connected to an inlet being in communication with sewer facilities.

Such installations have been unsatisfactory in the past, for when a camper or trailer leaves an area in which it is parked, the conduit is disconnected from the sewer inlet, and frequently without being completely drained. Waste material may discharge from the disconnected conduit and create an unsightly and unsanitary condition around the sewer inlet thereon that must be immediately cleaned up to eliminate the possibility of offensive odors.

The present invention includes an open receptacle of substantial depth that is preferably encased in concrete, which concrete is embedded in the ground, and the receptacle having a stub tubular waste connection that projects upwardly from the bottom thereof, as well as a drain in the bottom of the unit. The upwardly extending stub and drain are connected to a downwardly depending waste-receiving pipe or conduit that preferably is in communication with either an S-trap or a P-trap, which traps are in turn connected to a sewerline buried a substantial distance below the ground surface.

In the event that a conduit is inadvertently disengaged from the stub, and waste material discharges therefrom, the waste is confined within the receptacle, and may be easily disposed of by washing the receptacle with a hose, to cause the waste material to discharge from the receptacle into the sewerline. Each of the units is preferably prefabricated prior to being installed on the job site, and with the receptacle when set in a body of concrete, holding the waste-receiving unit at a fixed position relative to the sewerline. The receptacle is adapted to be fabricated from a number of weather-resistant materials, such as plastic, fiberglass, stainless steel and the like.

BACKGROUND OF THE INVENTION

1. Field of the Invention
Prefabricated waste receiving unit.
2. Description of the Prior Art Due to the rapidly increasing use of trailers, campers and vehicles of a similar nature that are moved from place-to-place, numerous park areas have been constructed in which such vehicles may be parked during the time that they are not being moved, and with the park areas being provided with such facilities as water, electricity and sewage inlets for the parked vehicles.

A troublesome problem in the operation of such parks in the past has been the inadvertent disconnecting of waste-conducting conduits from the parked vehicles to the sewage facilities, and the spillage of waste material from the conduits which creates an unsanitary condition, one that is objectionable in appearance, and one that must be cleaned up immediately to prevent the creation of disagreeable odors and the attraction of flies, insects and the like.

The primary purpose in devising the present invention is to provide recreation and trailer parks with waste-receiving facilities that may have conduits from trailers, campers and other vehicles easily connected thereto, and waste material, should it be inadvertently discharged from a conduit, being confined to a small area where it is easily washed through a drain into a permanent sewage facility. Covers may be provided that extend across the open top of the receptacles that form a part of the units, and these covers being of such design and color as to blend with surrounding landscaped areas and to not detract from the appearance thereof.

SUMMARY OF THE INVENTION

A waste-receiving unit particularly adapted for installation in areas in which vehicles having living quarters are parked, which unit is preferably delivered to the area for installation in a prefabricated condition, and requiring only that it be connected to an existing sewage line and held in a fixed position relative thereto. The unit is preferably held in such a fixed position by being at least partially embedded in a body of concrete or the like, which concrete is in turn embedded in the ground.

Each of the units includes a waste-receiving receptacle, a tubular stub extending upwardly from the bottom of the receptacle that is connectable to a conduit that extends to a trailer, camper or other vehicle containing living quarters, and the receptacle also including a drain that is connected to the same line that extends from the waste-receiving stub. The depth of the receptacle is preferably such that the upper extremity of the waste-receiving stub is situated below the upper extremity of the receptacle, and the receptacle when not in use being substantially concealed by a cover that spans the upper open end thereof.

A major object of the present invention is to provide a waste-receiving unit that is particularly adapted for installation in recreation and trailer park facilities, one that may be prefabricated in a substantially complete condition prior to delivery to the job site, with the installation requiring only the connection of a tubular member that forms a part of the unit to a sewer inlet, and the receptacle being set in a body of concrete, which body in turn is embedded in the earth.

Yet another object of the invention is to supply a waste-receiving unit that can be fabricated from standard commercially available materials, is simple and easy to install, is efficient in operation, eliminates the disagreeable chore of having to clean up spilled waste material from a large area, increases the sanitary conditions of the area in which it is installed, and due to the use of cover plates is relatively inconspicuous when not in use.

DESCRIPTION OF THE PREFERRED EMBODIMENT

Figure 1:
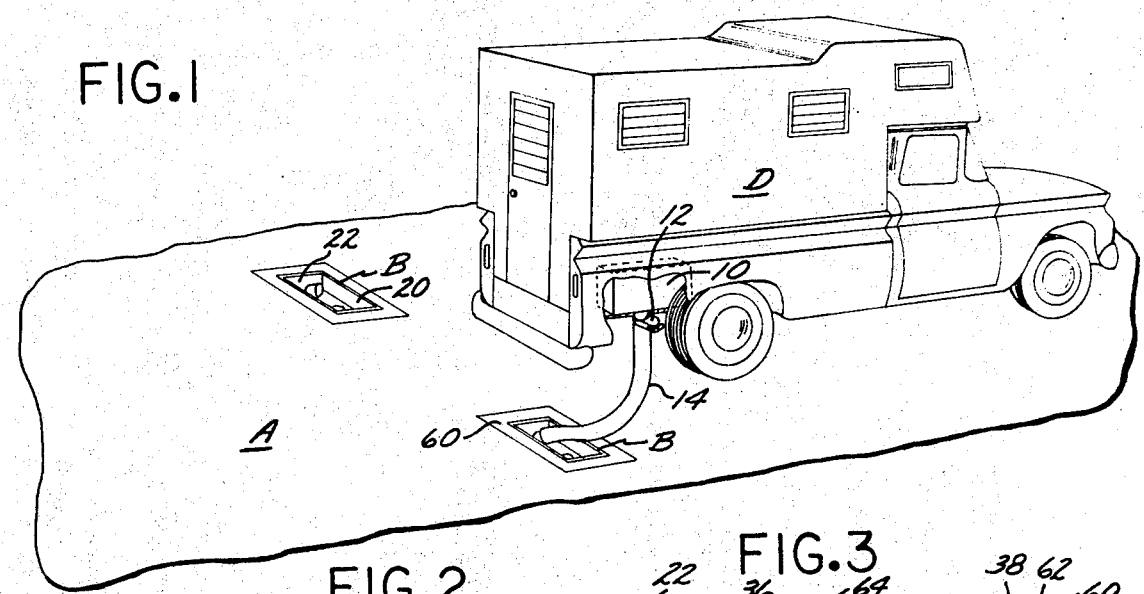
FIG. 1 is a perspective view of a camper, with a flexible conduit or hose extending therefrom to one of the waste-receiving units that is substantially disposed below the ground surface, and connected to an existing sewerline.

In FIG. 1 a parking area A is shown in which the waste-receiving units B that are the subject of the present application are longitudinally aligned, with each of the units being connected to a sewerline C that is disposed a substantial distance below the surface of the area A. The parking area A is adapted to have a number of vehicles D containing living quarters positioned thereon, with each vehicle, when so positioned being adjacent to one of the units B. In FIG. 1 the Vehicle D as is illustrated as being a camper, and as is conventional with such vehicles, includes a waste-receiving tank 10 that has a valve assembly 12 connected to the lower portion thereof, and through which valve assembly waste material can flow by gravity when the valve assembly is in the open position. The valve assembly is connected to a flexible conduit 14 which as may best be seen in FIG. 1 extends to one of the waste-receiving units B.

Figure 2:
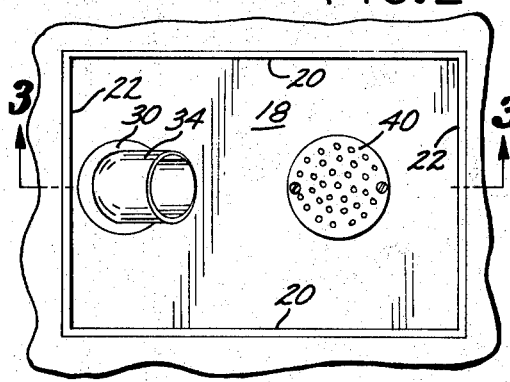
FIG. 2 is a top plan view of one of the waste-receiving units shown in FIG. 1, illustrating the upwardly extending tubular waste-receiving stub and the drain line through which material spilled in the receptacle may be discharged to the sewerline.
Figure 3:
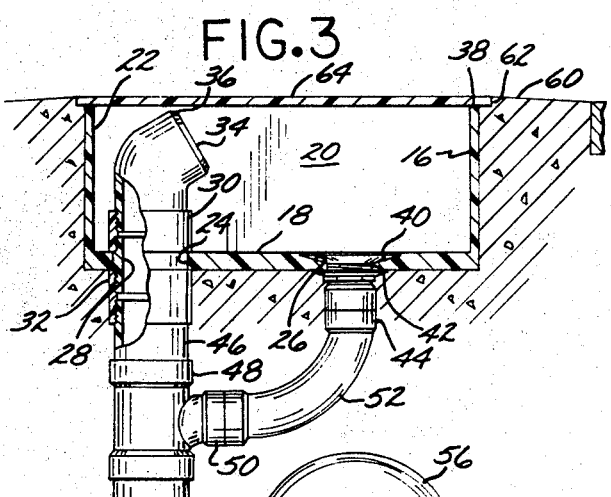
FIG. 3 is a combined side-elevational and vertical cross-sectional view of the unit shown in FIG. 2 and taken on the line 3—3 thereof.

The waste-receiving unit B as shown in FIGS. 2 and 3 includes a generally rectangular receptacle 16 that has a bottom 18 from which sidewalls 20 and end walls 22 extend upwardly. The bottom 18 is of substantial thickness and has a first opening 24 and second opening 26 formed therein. The receptacle 16 is preferably formed from plastic or fiberglass, although it is not limited to being fabricated from these particular materials. An externally threaded nipple 28 extends through first opening 24 as may best be seen in FIG. 3, and is threadedly engaged by an upper collar 30 and lower collar 32. The upper collar 30 is threadedly connected to a tubular elbow fitting 34, which is preferably a 22½° elbow. The collar 30 and elbow 34 are of such dimensions that the upper extremity 36 of the elbow is situated below the upper extremity 38 of the sidewalls 20 and end walls 22. Opening 26 tapers downwardly and inwardly, and receives a drain fitting 40 that has a tubular threaded member 42 that projects downwardly below bottom 18 and is engaged by a nut 44 that serves to hold a drain 40 in fixed sealing engagement with the bottom 18.

Figure 5:
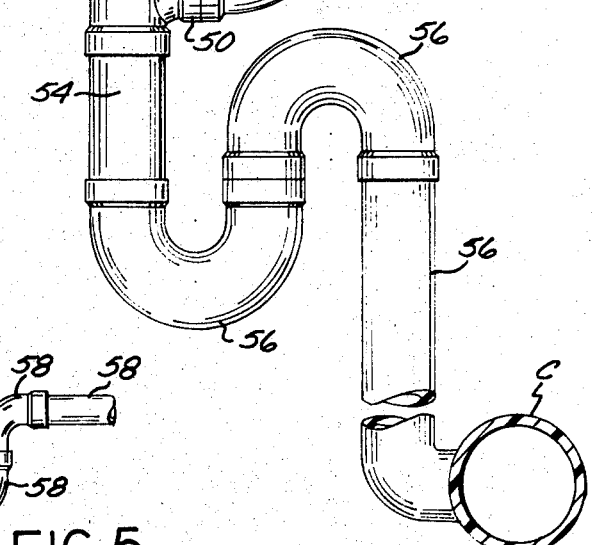
FIG. 5 is a side-elevational view of a P-trap that may be used in lieu of the S-trap illustrated in FIG. 4.

The collar 32 is connected to a tubular member 46 which in turn is in communication with a tubular tee 48 that has a leg 50 extending outwardly therefrom. The leg 50 is connected by a curved tubular member 52 to the threaded member 42. Tee 48 has a tubular leg 54 extending downwardly therefrom. The waste-receiving unit B as above described, is preferably shipped to the job site in a prefabricated condition and ready for installation as shown in FIG. 1. The tubular fittings above described are preferably formed from plastic, and while illustrated as being of threaded construction may also be of a slip fit if desired. The manner by which the waste-receiving units B will be connected to the sewerline is dependent upon the plumbing regulations in force in the jurisdiction in which the parking area A is located. In FIG. 3 it will be seen that the tubular member 54 is connected to an S-trap assembly 56 which extends to the sewerline C. However, the tubular member 54 may be connected to a P-trap assembly 58 as shown in FIG. 5 in those localities where such connections are permissible. Also, in some localities the tubular member 54 may be connected directly to a 90° elbow (now shown) that is in communication with a lateral (not shown) that extends to the sewerline C.

Figure 4:
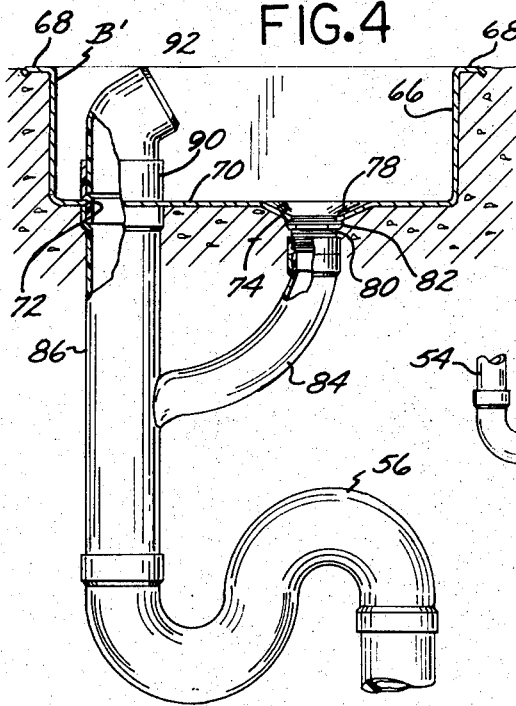
FIG. 4 is a second form of the waste-receiving unit.

After the waste-receiving units B are received in a prefabricated condition on the job site, excavation in the area A is made, with the tubular member 54 connected to the sewerline C by one of the facilities previously described, and the receptacle 20 disposed below the surface of the area A. When the receptacle 16 is so disposed, a body of concrete 60 is poured around the receptacle to a depth of 4 or 5 inches, and the concrete defining a rectangular apron that is preferably 6 to 8 inches in width although it may be narrower or wider if desired. The upper extremity 38 of the receptacle 16 is preferably set a small distance below the inner upper extremity of the upper surface of the body 60, and in alignment with a recess 62 formed in the concrete body. In this manner, a cover 64 may be provided to span the upper open end of the receptacle 16, and rests on a part of the concrete defining the recess 62. The cover 64 completely conceals the interior of the receptacle 16 when the waste-receiving unit is not in use. The cover may be of such color and ornamentality that it will blend with the landscape portion of the area A and not detract from the appearance thereof. When one of the waste-receiving units B is in use, the cover 64 is removed therefrom, and the conduit 14 caused to engage the most upwardly extending portion of the elbow 34. After the conduit has been placed in communication with the elbow 34, the valve assembly 12 is placed in the open condition and around to so remain so long as the vehicle D remains in the parking area A. When the vehicle D is ready to leave the parking area, the conduit 14 is manually manipulated to assure that all waste material therein drains into the elbow 34, with the valve assembly after such an operation being in a closed position. The conduit 14 is then disconnected from the valve assembly 12 and the tubular fitting 34, and the cover 64 placed on the receptacle B with which it is normally associated to occupy the position illustrated in FIG. 3. A second form B' of the waste-receiving unit is shown in FIG. 4, and differs from the first form B in that it it includes a rectangular receptacle 66 that is preferably formed from stainless steel or a like material that is subject to a minimum of corrosion when exposed to the weather and waste materials. The receptacle 66 preferably has flanges 68 extending outwardly therefrom that are substantially flush with the upper surface of the body of concrete 60 in which the receptacle 66 is embedded. The receptacle includes a bottom 70 that has first and second openings 72 and 74 formed therein. A drain 78 is mounted in the second opening 74, and has a tubular threaded member 80 projecting downwardly therefrom that is engaged by a nut 82 which nut serves to hold drain 78 in a firm position relative to the receptacle 66. The threaded member 80 is connected to a tubular curved upwardly extending leg 84 that forms an integral part of a tubular waste-carrying member 86 that on its lower end is connected to either the S-trap 56 as shown in FIG. 4, or if desired to the P-trap assembly 58 as illustrated in FIG. 5. The tubular member 86 extends upwardly to the first opening 72 and by suitable fittings 90 is connected to a 22½° elbow 92 that serves the same function as the elbow 34 as illustrated in FIG. 3. The tubular members above described in connection with the second form B' of the invention may be of either the slip fit or screw-type, and are prefabricated with the receptacle 66 to define the assembly shown in FIG. 4, prior to the second form B' of the invention being transported to the job site.

The use and operation of the first and second forms of the invention are the same and need not be repeated.

It will be particularly noted in FIG. 3 that the upper surface of the body of concrete 60 slopes downwardly and outwardly from the receptacle 16 to prevent surface water and rain flowing into the receptacle, and then to the sewerline C. Increasing the flow of water in the line C is undesirable as the sewage must be treated, and the additional water overburdens the treatment plant.

I claim:

1. A prefabricated waste-disposal unit that may be permanently connected to an underground sewerline in an area in which a vehicle containing a waste-receiving tank will be parked to effect communication by a conduit with said sewerline and a valve assembly on said tank, said valve assembly when in an open position allowing waste to drain through said conduit to said unit and then to said sewerline, said unit comprising:
  a. a receptacle that includes a bottom and sidewalls and end walls extending upwardly therefrom, said bottom having first and second openings therein;
  b. a plurality of first tubular members connected end-to-end that extend through said first opening and are disposed above and below said bottom and substantially normal thereto;
  c. a drain disposed in said second opening;
  d. first means for connecting said drain to said tubular members below said bottom;
  e. second means for holding said receptacle in an embedded fixed position in the ground adjacent said area whereby said conduit can be connected to the uppermost one of said first tubular members; and
  f. third means for connecting the lowermost one of said tubular members to said sewer to permit waste discharged into said first tubular members through said uppermost one thereof or through said drain and first means to flow to said sewer.

2. A waste-disposal unit as defined in claim 1 in which said second means is a body of concrete that is embedded in the ground and extends around the sidewalls and end walls of said receptacle, and the upper surface of said body of concrete defining a rectangularly shaped apron.

3. A waste-disposal unit as defined in claim 2 in which the inner edge portion of said apron defines a recess that is disposed above the upper extremities of said sidewalls and end walls, with the upper extremity of said uppermost one of said tubular members situated below the lowermost surfaces of said recesses, and said unit in addition including:

g. a cover that has the edge portions thereof removably supported in said recesses when said waste-disposal unit is not in use, and said cover when in place serving to conceal the interior of said receptacle.

4. A waste-disposal unit as defined in claim 2 in which said first means is a curved tubular member that is in communication with said drain and the interior of said first tubular members.

5. A waste-disposal unit as defined in claim 4 in which said third means is a tubular S-trap that is in communication with said lowermost member and said sewer.

6. A waste-disposal unit as defined in claim 4 in which said third means is a tubular P-trap that is in communication with said lowermost member and said sewer.

7. A waste-disposal unit as defined in claim 4 in which said third means is at least one curved tubular member that is in communication with said lowermost member and said sewer.

8. A waste-disposal unit as defined in claim 1 in which said receptacle and first tubular members are formed from a nonmetallic dimensionally stable material, and said uppermost one of said first tubular members has at least a portion thereof that is angularly disposed relative to said bottom of said receptacle.

9. A waste-disposal unit as defined in claim 2 in which said receptacle is formed from a metallic material that is resistant to corrosion, and said unit in addition including:
   g. a continuous horizontal flange that extends outwardly from the upper extremities of said end walls and sidewalls and overlies a portion of said concrete body that defines said apron.

10. A waste-disposal unit as defined in claim 2 in which said upper surface of said concrete body slopes downwardly and outwardly relative to said receptacle to prevent surface water entering said receptacle and flowing to said sewerline.

* * * * *